(12) United States Patent  
Stephan

(10) Patent No.: US 8,573,553 B2  
(45) Date of Patent: Nov. 5, 2013

(54) HOLDER FOR BEVERAGE CONTAINER

(75) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/446,285

(22) Filed: Apr. 13, 2012

(65) Prior Publication Data

US 2012/0280100 A1    Nov. 8, 2012

(30) Foreign Application Priority Data

May 2, 2011   (DE) .......................... 10 2011 075070

(51) Int. Cl.
| | | |
|---|---|---|
| *A47K 1/08* | (2006.01) | |
| *A47K 5/00* | (2006.01) | |
| *A47K 7/00* | (2006.01) | |
| *E04G 3/00* | (2006.01) | |
| *A47G 29/00* | (2006.01) | |
| *A47B 73/00* | (2006.01) | |

(52) U.S. Cl.
USPC .................. 248/311.2; 248/309.1; 248/312.1; 248/315; 248/284.1; 248/312; 224/926; 224/499; 211/71.01; 211/75; 211/77; 211/78; 211/80; 211/81; 220/476; 220/478

(58) Field of Classification Search
USPC ............. 248/311.2, 309.1, 312.1, 315, 284.1, 248/312; 224/926, 499; 211/71.01, 75, 77, 211/78, 80, 81; 220/476, 478
See application file for complete search history.

(56) References Cited

U.S. PATENT DOCUMENTS

| | | | | |
|---|---|---|---|---|
| 3,233,858 | A | * | 2/1966 | Benjamin ................. 248/311.2 |
| 4,434,961 | A | * | 3/1984 | Hoye ......................... 248/311.2 |
| 5,139,222 | A | * | 8/1992 | Koorey et al. ............. 248/311.2 |
| 5,191,679 | A | * | 3/1993 | Harper ........................... 16/363 |
| 5,238,211 | A | * | 8/1993 | Borovski ................... 248/311.2 |
| 5,328,143 | A | * | 7/1994 | Koorey et al. ............. 248/311.2 |
| 5,865,411 | A | * | 2/1999 | Droste et al. .............. 248/311.2 |
| 6,036,152 | A | * | 3/2000 | Hiscox et al. ............. 248/311.2 |
| 6,227,509 | B1 | | 5/2001 | Plocher et al. |

* cited by examiner

*Primary Examiner* — Terrell McKinnon  
*Assistant Examiner* — Christopher Garft  
(74) *Attorney, Agent, or Firm* — Vichit Chea

(57) ABSTRACT

A foldable holder for a beverage container comprises a fastening plate, a supporting ring coupled pivotably to the fastening plate, a holding bracket coupled pivotably to the fastening plate, and a supporting plate coupled pivotably to the holding bracket. The supporting ring and the holding bracket share a pivot axis extending from the fastening plate. The supporting plate is coupled to a remote end of the holding bracket so as to be pivotable counter to a pivoting direction of the supporting ring. The holding bracket and the supporting plate are disposed radially within the supporting ring when folded into a retracted state.

5 Claims, 1 Drawing Sheet

HOLDER FOR BEVERAGE CONTAINER

CROSS REFERENCE TO RELATED APPLICATIONS

This application claims priority to application 102011075070.3, filed in the German Patent and Trademark Office on May 2, 2011, and hereby incorporated by reference.

STATEMENT REGARDING FEDERALLY SPONSORED RESEARCH

Not Applicable.

BACKGROUND OF THE INVENTION

The present invention relates in general to beverage holders for passenger vehicles, and, more specifically, to a foldable holder with a small profile and that is also configurable as a shelf.

Fold-up cup holders have been disclosed having an upper ring for receiving a beverage container and a lower platform for supporting the beverage container. For example, U.S. Pat. No. 6,227,509 discloses a holder for a drinks container having a holding arm which is movable from a basic position into a holding position. In the holding position, the circumference of the holding arm supports a drinks container inserted into the holder. The patent shows a cover which is movable from a closed position into an open position, wherein the holder has a locking device which locks the holding arm in the basic position and is unlocked by opening of the cover.

U.S. Pat. No. 4,434,961 discloses a foldable holder for a drinks container that is pivotable about two axes located transversely with respect to each other in order to compensate for movements of a boat or other vehicle. The holder comprises a fastening plate to which a holding plate is pivotably fastened. A holding bracket is in turn fastened to the holding plate so as to be able to be opened out, wherein the holding bracket pivotably bears a supporting ring. The supporting ring bears a hinged holding bracket, to the end of which a supporting plate for the base of the drinks container is hingedly fastened.

In passenger vehicles such as automobiles, limited space may be available at the interior surfaces for mounting and stowing a cup holder. Earlier designs have required too much space and have required a complex arrangement of a relatively large number of component parts.

It is the object of the present invention to provide a hinged holder for a drinks container, in particular for motor vehicles, which holder can be adjusted between an opened-out use position and a flat, retracted non-use position. A particularly flat and thin profile is desired in the retracted position, particularly for use in the rear seat of a motor vehicle. Moreover, the holder should comprise as small a number of components as possible.

SUMMARY OF THE INVENTION

The present invention provides a foldable holder for a drinks container with a fastening plate, a supporting ring coupled pivotably to the fastening plate, a holding bracket coupled pivotably to the fastening plate, and a supporting plate coupled pivotably to the holding bracket. The cup holder is useful not only in motor vehicle applications, but also in any seating environment such as theater seating.

Owing to the fact that the pivot axes of the supporting ring and of the holding bracket lie on a line in the fastening plate, and that the supporting plate is coupled to the remote end of the holding bracket so as to be pivotable counter to the pivoting direction of the supporting ring, and that both the holding bracket and the supporting plate extend in such a manner that, in the retracted state, they are arranged within the supporting ring, the invention provides a holder for drinks containers which holder can be collapsed particularly flat such that it scarcely protrudes from the fastening surface. This is in particular also important for safety reasons when used in motor vehicles. A holder of this type is therefore especially suitable for the rear seat rows in passenger vehicles where scarcely any installation space is available.

In particular, it is advantageous if the fastening plate, the holding bracket and the supporting ring are nested one inside another with regard to the arrangement thereof along the pivot axis, thus 1) permitting a space-saving arrangement in the retracted state, since the supporting ring which projects in any case can surround the smaller components, and 2) makes possible a partially extended state which functions as a small storage or support shelf.

In a preferred embodiment, the fastening plate is engaged by the holding bracket at its outer edges along the pivot axis. It is also expedient if the holding bracket is correspondingly engaged by the supporting ring at its outer edges along the pivot axis.

It is also preferred for the side of the supporting plate which faces the holding bracket to have recesses for flushly receiving the holding bracket in the retracted state. An extremely flat arrangement can then be achieved in the collapsed state, since the supporting plate and the holding bracket lie on each other without one of the parts requiring additional space, and at the same time are surrounded by the supporting ring.

It is likewise preferred if the supporting plate extends approximately to the same length as the holding bracket. In the retracted state, the dimensions of the holder are therefore determined only by the diameter of the supporting ring and the maximum material thickness thereof.

DETAILED DESCRIPTION OF PREFERRED EMBODIMENTS

Figure 1:
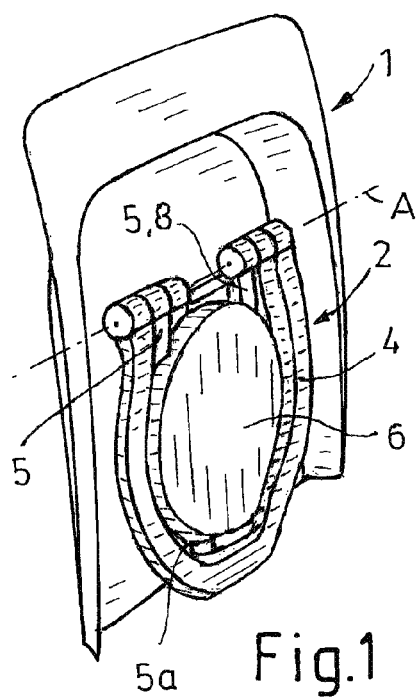
FIG. 1 is a schematic perspective view of a holder for drinks containers in the retracted state.
Figure 2:
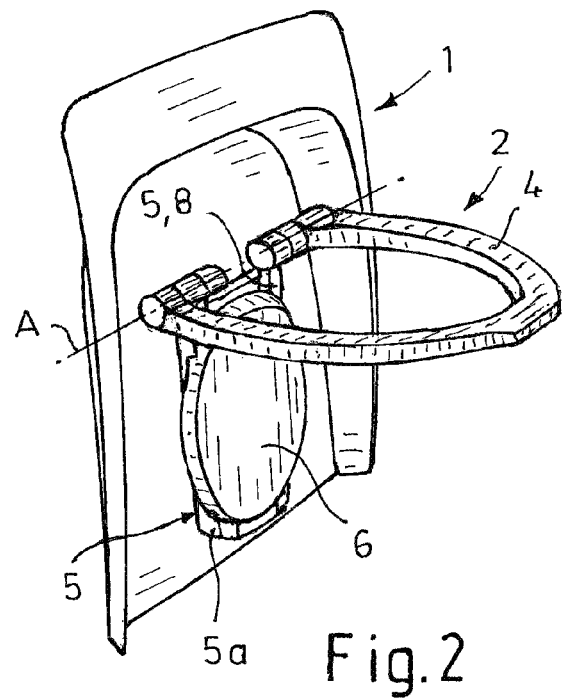
FIG. 2 is a schematic perspective view of the holder of FIG. 1 during the opening-out thereof.

The figures show a holder for drinks containers on a seat back rest niche 1 of a passenger vehicle, the holder being denoted as a whole by 2.

The holder 2 comprises a fastening plate 3 which is fastened in a planar manner to the seat backrest niche surface by adhesive bonding or screwing. On the upper side of the fastening plate 3, a supporting ring 4 is arranged so as to be pivotable about a pivot axis A in the manner of a hinge. The supporting ring 4 prevents an inserted drinks container from slipping out or down.

Likewise on the upper side of the fastening plate 3, a U-shaped holding bracket 5 is arranged so as to be pivotable about the same axis A in the manner of a hinge. In this case, the holding bracket 5 lies on the axis A between the supporting ring 4 and fastening plate 3. Thus, holding bracket 5 is engaged by supporting ring 4 around its outer edge at axis A (i.e., ring 4 surroundingly engages bracket 5). Likewise, fastening plate 3 is engaged by holding bracket 5 around its outer edge at axis A (i.e., bracket 5 surroundingly engages plate 3). Supporting ring 4 and holding bracket 5 are pivotable independently of each other about the axis A.

A supporting plate 6 is coupled to the remote end 5*a* of the holding bracket 5 so as to be pivotable counter to the pivoting direction of the supporting ring 4. That side 6*a* of the supporting plate 6 which faces the holding bracket 5 has recesses 7 for the flush receiving of the webs 8 of the holding bracket 5 in the retracted state.

Figure 3:
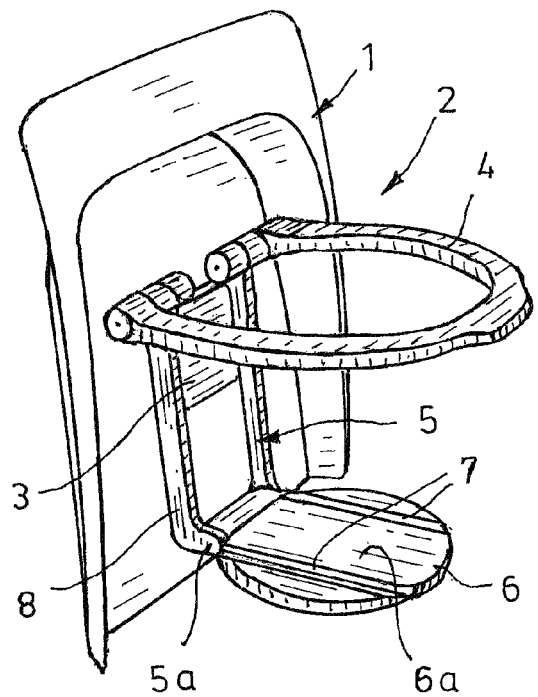
FIG. 3 is a schematic perspective view of the holder of FIG. 1 in the opened-out state.

The supporting plate 6 can pivot only through approximately 90 degrees, in the same manner as the supporting ring 4 in the opposite direction, to a position where supporting plate 6 is in the opened-out or extended position (compare FIG. 3 with FIG. 1). Rotation of supporting plate 6 is prevented beyond 90 degrees because it particularly has to "hold" the opened-out position in order to bear the drinks container. If desired, mutual frictional engagements may be provided respectively between supporting ring 4, holding bracket 5, supporting plate 6, and/or a hinge pin or pins joining them (not shown) in order to maintain their relative placements in or between the retracted and extended positions or to control vibrations.

Both the holding bracket 5 and the supporting plate 6 extend in such a manner that, in the retracted state, they are arranged radially within the supporting ring 4 in the same plane. The opened-out supporting plate 6 is therefore folded onto the holding bracket 5, with the webs 8 of the latter being received in the recesses 7. The supporting ring 4 is subsequently pivoted downward about the axis A toward the is backrest niche surface in order to take up the retracted state, or conversely, in order to take up the opened-out state.

For this purpose, the supporting plate 6 extends approximately to the same length as the holding bracket 5.

Figure 4:
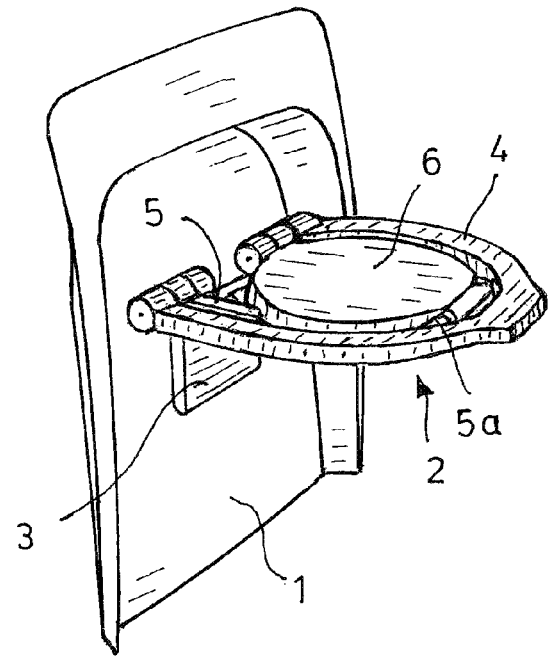
FIG. 4 is a schematic perspective view of the holder of FIG. 1 in the partially opened-out state.

As already mentioned, the holding bracket 5 with or without the supporting plate 6 and with or without the supporting ring 4 can also pivot about the axis A. In particular, holding bracket 5 may specifically pivot upward as shown in FIG. 4, through approximately 90 degrees into a horizontal position. Preferably, both the holding bracket 5 and the supporting ring 4 latch in such horizontal position, thus resulting in a type of storage surface.

What is claimed is:

1. A foldable holder for a beverage container comprising:
    a fastening plate having a substantially planar shape adapted for vertical mounting;
    a supporting ring coupled pivotably to the fastening plate;
    a holding bracket having a first end coupled pivotably to the fastening plate; and
    a supporting plate coupled pivotably to a second end of the holding bracket and extending a length substantially the same as a length of the holding bracket;
    wherein the supporting ring and the holding bracket share a pivot axis extending from the fastening plate;
    wherein the supporting plate is coupled to a remote end of the holding bracket so as to be pivotable counter to a pivoting direction of the supporting ring;
    wherein the holding bracket and the supporting plate are disposed radially within the supporting ring when folded into a retracted state; and
    wherein the holding bracket selectably holds the supporting plate in three positions including 1) flush against the fastening plate, 2) in a plane perpendicular to both the fastening plate and the holding bracket and which is below the pivot axis, and 3) in a plane perpendicular to the fastening plate which includes the pivot axis.

2. The holder of claim 1 wherein the fastening plate, the holding bracket, and the supporting ring are respectively nested inside each another along the pivot axis.

3. The holder of claim 1 wherein the fastening plate is engaged at an outer edge by the holding bracket along the pivot axis.

4. The holder of claim 1 wherein the holding bracket is engaged at an outer edge by the supporting ring along the pivot axis.

5. The holder of claim 1 wherein a side of the supporting plate facing the holding bracket includes recesses for the flush receiving of the holding bracket in the retracted state.

\* \* \* \* \*